United States Patent
Duduk

[15] 3,672,423
[45] June 27, 1972

[54] RADIAL, BIAS PLY TIRE

[72] Inventor: Alexander Duduk, 2300 S. 24th Road Apt. #731, Arlington, Va. 22206

[22] Filed: April 7, 1970

[21] Appl. No.: 26,411

Related U.S. Application Data

[63] Continuation-in-part of Ser. No. 789,242, Jan. 6, 1969, abandoned.

[52] U.S. Cl. ........................................152/356, 152/359
[51] Int. Cl. ..................................................B60c 9/06
[58] Field of Search ..............................152/356, 359, 361

[56] References Cited

UNITED STATES PATENTS

| | | | |
|---|---|---|---|
| 2,703,128 | 3/1955 | Darrow | 152/356 |
| 2,976,905 | 3/1961 | Beckadolph | 152/354 |
| 3,068,926 | 12/1962 | Jacob et al. | 152/354 |
| 3,118,483 | 1/1964 | Beckadolph | 152/361 |
| 3,164,193 | 1/1965 | Votani et al. | 152/356 |
| 3,217,778 | 11/1965 | Kovac et al. | 152/359 |
| 3,393,252 | 7/1968 | Zimmerman | 260/875 |
| 3,402,752 | 9/1968 | Beringer | 152/359 |
| 3,419,059 | 12/1968 | Bridge, Jr. | 152/359 |
| 3,442,315 | 5/1969 | Mirtain | 152/354 |
| 1,364,870 | 1/1921 | Ehle | 152/355 |
| 2,179,374 | 11/1939 | Kraft | 152/356 |

FOREIGN PATENTS OR APPLICATIONS

| | | | |
|---|---|---|---|
| 869,603 | 1/1953 | Germany | 152/356 |

*Primary Examiner*—Arthur L. La Point
*Assistant Examiner*—Robert Saifer
*Attorney*—Spencer & Kaye

[57] ABSTRACT

A tire construction is disclosed wherein there is a combination of radial and bias plies, there typically being twice as many bias plies as radial plies. In a preferred embodiment for passenger car utilization, three plies are employed, a radial ply being disposed outside two bias plies. Both the bias and radial plies are preferably 12s × 12z twist for 1,260/2 and 840/3 denier cords and 10S × 10Z twist for 1,100/2 and 840/2 denier cords, while either of these twists may be employed with 1,100/3 denier cords. The angle of the bias ply in the cured crown is preferably 35° and the radial ply preferably 90°. The preferred thermal shrinkage at 190° C. of both plies is approximately 17 percent (12 tpi). With these specific parameters, a cooperative structure between the radial and bias plies is effectuated which facilitates manufacture of these tires especially with respect to conventional radial ply tires.

19 Claims, 4 Drawing Figures

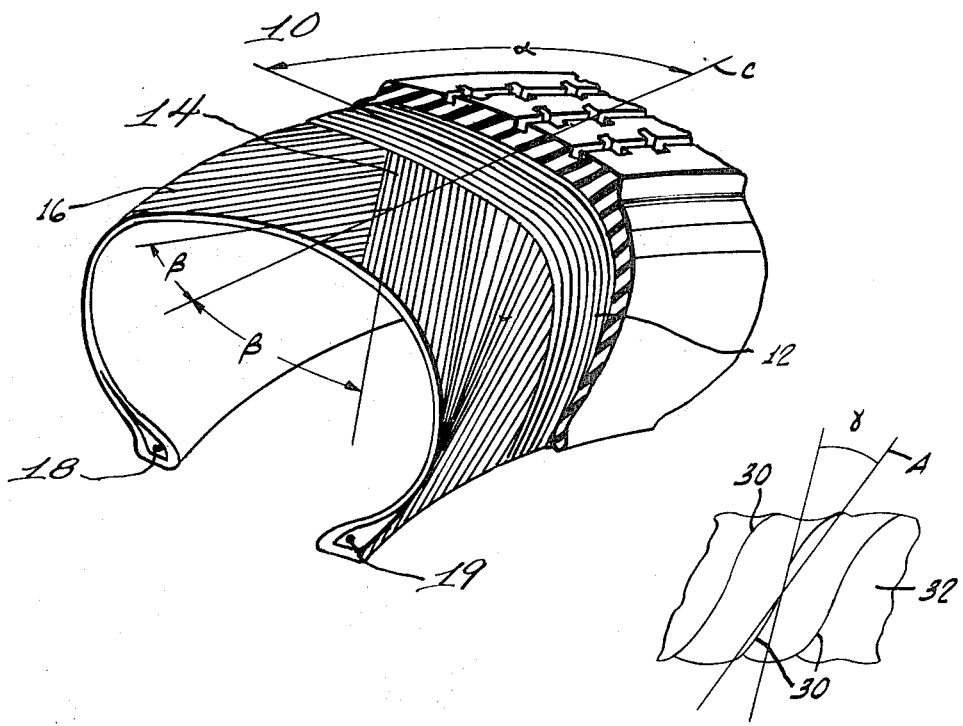
Fig. 1
Fig. 2a
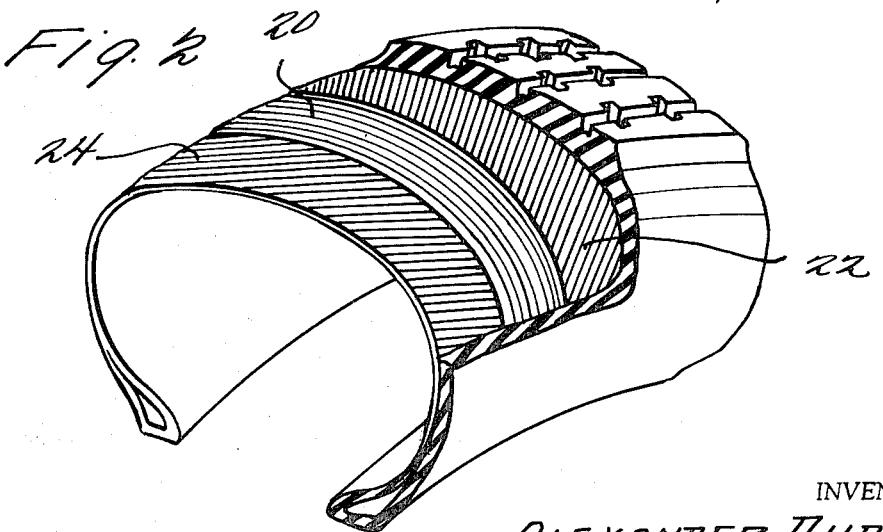
Fig. 2
INVENTOR
ALEXANDER DUDUK
BY Addams & Ferguson
ATTORNEYS

| TYPE | (1) | (2) | (3) | (4) | (5) | (6) |
|------|-----|-----|-----|-----|-----|-----|
| I | BIAS | BIAS | RADIAL | | | |
| Ia | BIAS | BIAS | RADIAL | BIAS BREAKER | BIAS BREAKER | |
| II | RADIAL | BIAS | BIAS | | | |
| III | BIAS | RADIAL | BIAS | | | |
| IV | RADIAL | BIAS | BIAS | RADIAL | BIAS | BIAS |
| V | BIAS | BIAS | RADIAL | BIAS | BIAS | RADIAL |
| VI | BIAS | BIAS | RADIAL | BIAS | BIAS | |
| VII | BIAS | BIAS | BIAS | BIAS | RADIAL | |

Fig. 3

INVENTOR
ALEXANDER DUDUK

BY Addams + Ferguson
ATTORNEYS

RADIAL, BIAS PLY TIRE

This application is a continuation-in-part of U. S. application Ser. No. 789,242, filed by Alexander Duduk on Jan. 6, 1969 now abandoned.

BACKGROUND OF THE INVENTION

This invention relates to tire constructions and, in particular, to radial ply tires.

As has become well known, radial ply tires have certain advantages with respect to conventional bias ply tires such as good cornering ability, good traction, and good acceleration properties with increased gas mileage and improved tread wear. However, the conventional radial ply tires are quite expensive with respect to conventional bias ply tires and usually give such a rough ride that a modified automobile suspension is required to meet U. S. standards of ride comfort. The rough ride results from heavy continuous circumferential belts of rayon, glass or steel which are employed in typical conventional radial tires.

Further, the procedure for manufacturing conventional radial ply tires requires lay-up procedures which render the manufacturing cost of these tires quite prohibitive when compared with conventional bias ply tires. Also, costly section molds are required in the manufacture of conventional radial ply tires.

Briefly, then, it is a primary object of this invention to provide an improved radial ply tire, the cost of manufacture of which corresponds to that of conventional bias ply tires.

It is a further object of this invention to provide a radial ply tire which can be manufactured in accordance with standard U. S. techniques for manufacturing conventional bias ply tires.

It is a further object of this invention to provide a radial ply tire which can be manufactured without special sectional molds or costly lay-up procedures.

It is a further object of this invention to provide a radial ply tire which does not require the use of continuous circumferential belts.

It is a further object of this invention to provide an improved radial ply tire having radial and bias plies, as well as such a tire having certain specific parameters of these plies resulting in a cooperative structure between the radial and bias plies which facilitates manufacture of the tire.

It is a further object of this invention to provide an improved radial ply tire having the good cornering, traction, and acceleration properties with increased gas mileage and improved tread wear of radial ply tires without the disadvantage of higher cost, rough ride and other disadvantages of radial ply tires.

Other objects and advantages of this invention will become apparent upon reading the appended claims in conjunction with the following detailed description and attached drawing.

PRIOR ART

U. S. Pats, Nos 1,202,000 granted to W. W. McMahan et al., and 1,364,870 granted to R. Ehle disclose tire constructions having what at first impression may appear to be a combination of radial and bias plies, in that the tire construction shown in the former has no plies, as the term is known in the art, but square-woven fabrics, and the tire construction shown in the latter includes a radial insert rather than a ply, that is to say, a part which extends from crown to bead and between the actual plies. As stated above, the primary object of this invention is to provide a radial ply tire having radial and bias plies as well as such a tire where the parameters of the plies are such as to facilitate manufacture of the tire utilizing the manufacturing techniques typically employed to manufacture conventional bias ply tires and thus, render the construction of radial ply tires in accordance with this invention much more economical than the construction of conventional radial ply tires. There is no disclosure whatsoever in these prior art references of these parameters. That is, the particular combination of an outer radial ply and two inner bias plies of the specifical angles, shrinkage and twist level specified hereinafter is not disclosed in the above cited patents, both of which involve five- and six-ply clincher tube type tires containing cotton staple fabric and cord construction with the cord being twisted only in the S-direction. Further, no angle for the bias plies is specified and neither is the denier for both the radial and bias plies. Also because of the cotton employed in the plies of the tires disclosed in the above cited patents a substantially lengthy manufacturing time is required.

BRIEF DESCRIPTION OF THE DRAWING

FIG. 1 is an isometric illustration of a cutaway tire showing a preferred embodiment of the invention relating to a passenger tire construction.

FIG. 2 is an isometric illustration showing another embodiment of the invention relating to a passenger tire construction.

FIG. 2a shows a detail on an enlarged scale.

FIG. 3 is a table illustrating various orders of plies contemplated in preferred embodiments of the invention for both passenger and truck tire constructions.

DETAILED DESCRIPTION OF A PREFERRED EMBODIMENT OF THE INVENTION

Referring to FIG. 1 there is shown a cutaway tire 10 which illustrates a preferred embodiment of the invention relating to passenger tire construction. A radial ply 12 is disposed outside two oppositely oriented bias inside plies 14 and 16. The preferred range of the angle $\alpha$ of the radial ply, with respect to the centerline C of the tire, in the cured crown is 78° or more to either side, i.e., the angle $\alpha$ is at least 78°, with the preferred angle being 90°. The preferred angle range $\beta$ for the bias plies 14 and 16, likewise with respect to line C, is 10° to 55° and even as much as 70° as is set fort below, in the cured crown and preferably 35° in the cured crown. All plies are preferably made from nylon, polyester, rayon continuous filament or a similar type material. The tire type is preferably tubeless and of low profile. The twist range of all plies is preferably 8 to 14 turns per inch "S" and "Z" construction for all deniers and all materials, the preferred twist being (1) 12S × 12Z for 1,260/2 and 840/3 denier cords with the denier preferably being 1,260/2, and (2) 10S × 10Z for 1,100/2 and 840/2 denier cords, while either of these twists may be employed with 1,100/3 denier. The thermal shrinkage range at 190° C. for both radial and bias deniers is preferably 15percent (12 tpi) to 19 percent (12 tpi), the preferred shrinkage being 17 percent (12 tpi). The above parameters apply for all embodiments of the invention.

Preferably the radial ply is outside as shown in FIG. 1 although other orders of the plies will be illustrated in other figures of the drawing. All plies, both radial and bias, are tied around beads 18 and 19 conventionally disposed within the tire, as indicated in FIG. 1.

In conventional radial ply tires rayon, glass or steel is used in the continuous circumferential belts while rayon or steel is used in the radial plies. In accordance with this invention, belts do not have to be employed and thus a smoother ride is effected. In an optional modification of the embodiment of FIG. 1 one radial or two bias breakers may be disposed below the tread, these layers being made from the materials mentioned hereinbefore with respect to the radial and bias plies of this invention. The purpose of the breakers would be to improve the dimensional stability and tread wear and protect against puncture and bruising while improving traction. However, the addition of additional breakers would make it more costly to construct the tire in terms of additional fabric required and additional manufacturing steps. Bias breakers could also be added to the other embodiments of the invention to be discussed in more detail hereinafter.

Conventional radial ply tires are manufactured with a split mold. That is, in a typical belted, radial ply tire, the dimensional stability is so great that the tire does not conform to the mold and thus in order to make the tread design, the mold must be movable to form the tire. Without a sectional mold, considerable distortion of the tire may occur. However, the tire in accordance with this invention can be built using standard U. S. tire construction procedures and equipment.

Further, the belt design in a conventional radial ply tire requires additional manufacturing steps in that the radial plies must first be made up and then transferred to another drum where the belts are placed and centered. The tread is then molded in the sectional mold. The radial ply tire of this invention as stated above may be made using standard U. S. tire construction procedures and equipment thus effecting a labor-saving of approximately 4.5 minutes per tire. The approximate value of this saving is equal to the cost of constructing five conventional bias two-ply tires.

Reference should now be made to FIG. 2 which shows another embodiment of a three-ply passenger tire where the order of the plies is different from that shown in FIG. 1. In particular, the radial ply 20 is disposed between the bias plies 22 and 24.

Reference should now be made to FIG. 3 which is a table illustrating different orders of plies contemplated in accordance with this invention, although it is felt that even further embodiments of the invention may be made although not listed in the table. Types I and III of the table respectively correspond to the embodiments of FIGS. 1 and 2 while Type Ia corresponds to the modification of FIG. 1 discussed hereinbefore. In the table, the order of the plies is such that the innermost ply is listed first and the outermost last. Thus, it can be seen that the Type I tire corresponds to the tire of FIG. 1. Types I–III correspond to passenger tire constructions while Types IV–VII correspond to truck tire constructions. Adjacent bias plies are oppositely oriented.

In the truck tire constructions both the radial and bias plies should preferably be 1,260/2 denier, the remaining parameters being the same as those specified for passenger tire construction as discussed hereinbefore.

As stated before, the radial ply angle range should, preferably, be at least 78°. Further, for some tire constructions, snaking or undulations in the radial ply with respect to the axis of the ply is sometimes desirable. The snaking should generally but not necessarily be less than 20°. However, due to cord variations, individual undulations could exceed 20°; but, on the average, the snaking should be less than approximately 20°. FIG. 2a shows the maximum snake angle $\alpha$ which the ply cords 30 form with the axis A of the particular ply 32 involved.

It has been stated before that the preferred angle range of the bias ply should be 10° to 55°; however, for some tire constructions, the bias angle range may be extended from 10° to 70°. Also with respect to some truck tire constructions, the radial ply angle range should preferably be limited to 80° through 90° and the bias ply angle range limited to 31° through 55°. However, with respect to the Type VII truck tire construction of FIG. 3, the bias ply angle range should be preferably limited to 10° through 33° and the radial ply angle range should be limited to 80° through 90°.

The plies may be made from a material selected from the group of manmade fibers consisting of polyamide, polyester, and rayon continuous filament or a combination thereof. Also the denier of all plies, both radial and bias is preferably between 840 and 1,680 where the shrinkage of the fully synthetic materials at 199° C. may be about 15 percent at 10 tpi to about 19 percent at 10 tpi. Further, a preferred tire construction is that of the tubeless type having a low profile where one radial or two bias breakers may be disposed beneath the tread or between the radial and bias plies.

The truck tire construction of this invention results in a lower cost of manufacture with respect to radial ply truck tires because of (1) the elimination of one of the manufacturing steps employed in the manufacture of conventional radial truck tires; (2) the elimination of one piece of building equipment normally employed to make such tires; and (3) the elimination of sectional molds, as discussed hereinbefore. Further, all truck tires in accordance with this invention have the following advantages over conventional truck tires; (1) better tread wear, and (2) better traction for off the road applications.

Tables I and IA respectively illustrate further passenger and truck tires together with their ply ratings employing the principles of this invention.

TABLE I.—PASSENGER TIRES AND THEIR PLY RATINGS

| Type No. | Number of plies | | | Actual plies | Ply rating | Denier-range |
|---|---|---|---|---|---|---|
| | 1 | 2 | 3 | | | |
| 1 | Bias | Bias | Radial | 3 | 6 | 600–1,800 |
| 2 | do | do | do | 4 | 8 | 600–1,800 |
| 3 | Radial | do | Bias | 3 | 6 | 600–1,800 |
| 4 | Bias | Radial | do | 3 | 6 | 600–1,800 |
| 5 | Bias | Radial | Bias | 4 | 8 | 600–1,800 |
| 6 | do | do | Radial | 4 | 8 | 600–1,800 |
| 7 | Radial | Bias | Bias | 4 | 8 | 600–1,800 |
| 8 | do | Radial | do | 4 | 8 | 600–1,800 |
| 9 | Bias | Bias | Radial | 3 | 7 | 600–1,800 |
| 10 | do | do | do | 3 | 8 | 600–1,800 |
| 11 | do | do | Breaker | 3 | 6 | 600–1,800 |
| 12 | Radial | Breaker | Bias | 3 | 6 | 600–1,800 |
| | Number of plies | | | | | |
| | 4 | 5 | | | | |
| 1 | | | | 3 | 6 | 600–1,800 |
| 2 | Radial | | | 4 | 8 | 600–1,800 |
| 3 | | | | 3 | 6 | 600–1,800 |
| 4 | | | | 3 | 6 | 600–1,800 |
| 5 | Radial | | | 4 | 8 | 600–1,800 |
| 6 | Bias | | | 4 | 8 | 600–1,800 |
| 7 | Radial | | | 4 | 8 | 600–1,800 |
| 8 | Bias | | | 4 | 8 | 600–1,800 |
| 9 | Breaker | | | 3 | 7 | 600–1,800 |
| 10 | do | Breaker | | 3 | 8 | 600–1,800 |
| 11 | Radial | | | 3 | 6 | 600–1,800 |
| 12 | Bias | | | 3 | 6 | 600–1,800 |

NOTE.—a. Above ply ratings can be increased or decreased by changes in Ends of Cords per Inch and deniers of cord.

TABLE IA.—TRUCK-BUS AND OFF-THE-ROAD TIRES AND THEIR PLY RATINGS

| Type No. | Number of plies | | | | | Actual plies | Ply rating | Denier-range |
|---|---|---|---|---|---|---|---|---|
| | 1 | 2 | 3 | 4 | 5 | | | |
| 1A | Bias | Bias | Radial | Radial | | 4 | 8 | 750–2,000 |
| 2A | do | do | do | do | Breaker | 4 | 9 | 750–2,000 |
| 3A | do | do | do | do | do | 4 | 10 | 750–2,000 |
| 4A | do | do | Bias | Bias | Radial | 5 | 10 | 750–2,000 |
| 5A | do | do | do | do | do | 5 | 11 | 750–2,000 |
| 6A | do | do | do | do | do | 5 | 12 | 750–2,000 |
| 7A | Radial | do | do | Radial | Bias | 6 | 13 | 750–2,000 |
| 8A | do | do | do | do | do | 6 | 14 | 750–2,000 |
| 9A | Bias | do | do | do | Radial | 8 | 16 | 750–2,000 |
| 10A | do | do | do | do | do | 9 | 18 | 750–2,000 |
| 11A | do | do | do | do | do | 10 | 20 | 750–2,000 |
| | Number of plies | | | | | | | |
| | 6 | 7 | 8 | 9 | 10 | | | |
| 1A | | | | | | 4 | 8 | 750–2,000 |
| 2A | | | | | | 4 | 9 | 750–2,000 |
| 3A | Breaker | | | | | 4 | 10 | 750–2,000 |
| 4A | | | | | | 5 | 10 | 750–2,000 |
| 5A | Breaker | | | | | 5 | 11 | 750–2,000 |
| 6A | do | Breaker | | | | 5 | 12 | 750–2,000 |
| 7A | Bias | do | | | | 6 | 13 | 750–2,000 |

TABLE IA.—TRUCK-BUS AND OFF-THE-ROAD TIRES AND THEIR PLY RATINGS—Continued

| Type No. | Number of plies | | | | | Actual plies | Ply rating | Denier-range |
|---|---|---|---|---|---|---|---|---|
| | 6 | 7 | 8 | 9 | 10 | | | |
| 8A | do | do | Breaker | | | 6 | 14 | 750–2,000 |
| 9A | do | Bias | Bias | | | 8 | 16 | 750–2,000 |
| 10A | do | do | do | Radial | | 9 | 18 | 750–2,000 |
| 11A | do | do | do | do | Radial | 10 | 20 | 750–2,000 |

NOTE. a. Above types can be constructed with one or more breakers; b. Above types can be constructed using any number of ply combinations and number of plies.

EXAMPLE 1

Nylon 6—6 tire yarn of 1,260 denier/210 filament was twisted into 10 turns "S" and 10 turns "Z" cord. Multiends of this cord were treated with conventional resorcinal formaldehyde latex finish, dried at 325° F. for 120 seconds at 1 percent stretch, then tensilized at 410° F. at 12 percent stretch for 30 seconds residence time, and then annealed at 400° F. temperature at 0 percent tension for 50 seconds residence. This cord had a thermal shrinkage of 15 percent as measured at 190° C. These nylon cords were made into a rubber coated fabric where the two lower bias plies were at 29 ° ½° to their longest axis and intersected each other at 59° angles. The radial ply, being located on the outside, was at 90° angles to the longest axis of the fabric. This fabric, along with other green components such as innerliner, chafers, and cap and base tread unit, was built into 8.25 × 14 size tubeless tires. The inner two bias plies and the outer radial were each wrapped around the bead with a conventional step-off. The tire was vulcanized using 375° F. internal steam and 336° F. external steam on a conventional McNeil Bagomatic curing press. The vulcanized tire was removed from the vulcanization mold, placed in a post-inflation stand for a period of time equal to the cure time in the vulcanization mold. The post-inflated tire had a cap, shore hardness of 65. The two bias plies were at 38° angles to the centerline of the tire and these intersected at a 76° included angle. The outer radial ply was at 90° angles to the fiber axis and exhibited a snaking of the cord in the shoulder area. This snaking is desirable, as it allows the two bias plies to move independently of the radial ply.

The tires were then tested under standard General Services Administration test procedure (GSA) at rated loads of 100 percent, 120 percent and 140 percent, at a speed of 60 mph. This was compared with a two-ply, 1,260 denier/210 filament nylon 6—6 tire of 10 "S" × 10 "Z" cord construction, all bias ply construction. Additionally, a four-ply 840 denier/140 filament nylon tire of 12 "S" × 12 "Z" cord construction was tested under identical conditions. Test results are given in Table II.

Initial riding roughness is a characteristic of flexible nylon tires, the time of disappearance of this initial roughness due to flat spotting is the best measurement to characterize relative freedom from flat spotting. In panel jury ride tests, it was found that the conventional four-ply bias nylon tire showed longest time of runout; the two-ply nylon tire, a significantly shorter runout time; and the three-ply bias radial tire, unexpectedly showed shorter runout time than the two-ply tire. This is believed due to the more uniform roundness of the bias radial tire and the rigidity of the bias radial construction. Using a plunger energy test, the rating of the tires were: best, three-ply bias radial; second best, four-ply bias; lowest, two-ply bias.

Because of the rigidity, lack of squirming, there was less heat buildup in the three-ply bias radial tire than in the four-ply or two-ply tires.

The three-ply bias radial tire had better cornering and improved highway control compared with the two-ply and four-ply all bias construction.

TABLE II

| Tire construction | Fabric construction | Cord construction | Panel road test for comfort |
|---|---|---|---|
| 4/4 ply | 840/2–140, 28½° angle. | 12S x 12Z | Detectable as in "flat spot" terms of riding comfort. |
| 2/4 ply | 1260/2–210, 29½° angle. | 10S x 10Z | Slightly detectable as in "flat spot" terms of riding comfort. |
| 3/3 ply | Bias—840/2–140, 29½° angle. Radial—1260/2–210, 90° angle. | 12S x 12Z / 10S x 10Z | Not detectable as in "flat spot" terms of riding comfort. |

Wheel test (G.S.A. standard)

| | Hrs. at 100% | Hrs. at 120% | Hrs. at 140% | Total hours |
|---|---|---|---|---|
| 4/4 ply | 7 | 16 | 25 | 48 |
| 2/4 ply | 7 | 16 | 20 | 43 |
| 3/3 ply | 7 | 16 | 61 | 84 |

EXAMPLES 2–5

A series of nylon and regular rayon passenger tires were made up with the constructions as given in Table III. Tires were made up containing nylon and rayon and combinations thereof. The nylon and rayon were tensilized by processes conventionally employed for these tire cords. All tires were vulcanized and post-inflated as indicated in Example 1.

All the radial ply or plies in the bias radial tires exhibited snaking in the shoulder area of less than 20°, generally less than 5°. However, if tires were made with no flexing of the radial ply in the shoulder area, they had reduced (GSA endurance test) life, as the two bias plies could not move independently of the radial ply or plies.

Table IV lists the panel jury evaluation of tire constructions shown in Table III, which were road tested for flat spot runout time, cornering, and highway control. As can be rated from Table IV, all bias radial ply combinations of this invention showed good to excellent in flat spot riding comfort, cornering, and highway control.

The bias radial three-ply tires were generally superior in GSA endurance test to all bias two-ply and four-ply control tires.

The highway comfort riding characteristics of the bias, radial tires of this invention were quite superior to the tires described in Example 1.

TABLE III

| Ex. | Total plies | Bias plies | | Radial plies | | Bias cord construction | | | Radial cord construction | | | Tire cured crown angle | | |
|---|---|---|---|---|---|---|---|---|---|---|---|---|---|---|
| | | Number of plies | Material | Number of plies | Material | Denier | Number of filaments | Twist | Denier | Number of filaments | Twist | Bias ply angle to axis | Bias ply[1] | Radial ply angle |
| 2 | 3 | 2 | 66 Nylon | 1 | 66 Nylon | 840/2 | 140 | 12S x 12Z | 1,260/2 | 210 | 10S x 10Z | 39°±1 | 78° | 90°±2 |
| 3 | 3 | 2 | Rayon | 1 | Rayon | 1,650/3 | 1,100 | 8S x 8Z | 1,650/3 | 1,100 | 8S x 8Z | 37°±2 | 74° | 90°±1 |
| 4 | 3 | 2 | EF-121-5 | 1 | EF-121-5 | 1,260/2 | 210 | 10S x 10Z | 1,260/2 | 210 | 10S x 10Z | 39°±1 | 78° | 90°±1 |
| 5 | 3 | 2 | 66 Nylon | 1 | 66 Nylon | 840/2 | 140 | 12S x 12Z | 840/2 | 140 | 12S x 12Z | 38°±2 | 76° | 90°±1 |

[1] Includes angle of intersection.

TABLE IV

| Ex. | Shrinkage Bias | Shrinkage Radial | Riding comfort | Wheel test (G.S.A. standards) Hrs. at 100% | Hrs. at 120% | Hrs. at 140% | Total hours | Roadability Cornering | Highway control |
|---|---|---|---|---|---|---|---|---|---|
| Control #1 | 16 | | Fair | 7 | 16 | 20 | 43 | Poor | Poor. |
| Control #1A | 14 | | Poor | 7 | 16 | 25 | 48 | Fair | Fair. |
| 2 | 14 | 14 | Good | 7 | 16 | 61 | 84 | Good | Good. |
| 3 | 4 | 4 | Excellent | Not wheel tested | | | | Excellent | Excellent. |
| 4[1] | 12 | 12 | (No test) | 7 | 13 | | 20 | (No test) | (No test). |
| 5 | 14 | 14 | Excellent | Not wheel tested | | | | Excellent | Excellent. |

[1] Tire constructed of single end fabric. Radial ply cord was tensilized in manner which removed snaking in radial ply of cured tire.

NOTE.—Control #1—2/4-ply, 1,260/2-210 denier, bias ply, Nylon 66 tire cord; Control #1A—4/4-ply, 840/2-140 denier, bias ply, Nylon 66 tire cord.

As stated hereinbefore, a preferred thermal shrinkage range of 15 percent to 19 percent has been specified. However, this is typically applicable to material having high stretch and shrinkage ranges such as nylon. However, with respect to nylon, in some tire constructions, it may be desirable to tensilize the cord using a high stretch, which would result in high thermal shrinkage in the vulcanization of the tire. Hence, in such constructions, the thermal shrinkage range may extend as high as approximately 25 percent. Further, with respect to low shrinkage and low stretch material such as rayon, it would be desirable to have a thermal shrinkage range of approximately 0 to 15 percent.

Numerous modifications of the invention will become apparent to one of ordinary skill in the art upon reading the foregoing disclosure. During such a reading it will be evident that this invention provides a unique radial, bias ply tire for accomplishing the objects and advantages herein stated.

What is claimed is:

1. A tire construction having a cured crown having a centerline and two opposite beads there being but a single bead on each side of the tire, said tire having at least one radial ply and at least two oppositely oriented bias plies, each ply having cords each of which extends from the single bead on one side to the single bead on the other side and around each such bead, half of the bias plies being oppositely oriented from the other half, the angle range of the cords of the bias plies in said cured crown being 10°–70° with respect to the centerline, the angle of the cords of the radial ply in said cured crown being at least 78° with respect to the centerline, and the cords of only said radial ply being snaked.

2. A tire construction as in claim 1 where the plies are made from a material selected from the group consisting of nylon, polyester or rayon continuous filament.

3. A tire construction as in claim 1 including bias breakers disposed beneath the tread.

4. A tire construction as in claim 1 where the denier of all plies, both radial and bias, is 1260/2.

5. A tire construction as in claim 1 where the tire type is tubeless and of low profile.

6. A tire construction as in claim 1 suitable for use as a truck tire where two oppositely oriented bias plies are disposed inside two further oppositely oriented bias plies, which in turn are disposed within one radial ply, the total number of plies being five.

7. A tire construction as in claim 1 suitable for use as a truck tire where two bias plies are disposed inside one radial ply which in turn is disposed inside two bias plies, the total number of plies being five.

8. A tire construction as in claim 1 where the number of bias plies is twice the number of radial plies, half of the bias plies being oppositely oriented from the other half.

9. A tire construction as in claim 8 for use as a passenger automobile tire where one radial ply is disposed outside of two bias plies, the total number of plies being three.

10. A tire construction as in claim 8 for use as a passenger automobile tire where one radial ply is disposed inside of two bias plies, the total number of plies being three.

11. A tire construction as in claim 8 for use as a passenger automobile tire where one radial ply is disposed between two bias plies, the total number of plies being three.

12. A tire construction as in claim 8 for use as a truck tire where one radial ply is disposed inside of two bias plies which in turn are disposed inside of one radial ply which in turn is disposed inside of two bias plies, the total number of plies being six.

13. A tire construction as in claim 8 for use as a truck tire where two bias plies are disposed inside of one radial ply which in turn is disposed inside of two bias plies which in turn are disposed inside of one radial ply, the total number of plies being six.

14. A tire construction as in claim 1 where the angle of the bias plies in the cured crown is approximately 35°, the angle of the radial ply in the cured crown is approximately 90°, the twist of all plies is 12S × 12Z for all deniers, and the thermal shrinkage at 190° C. is approximately 17 percent (12 tpi).

15. A tire construction as in claim 8 including bias breakers disposed beneath the tread.

16. A tire construction as in claim 1 where the twist range of all plies is 8–14 turns per inch "S" and "Z" construction for all deniers.

17. A tire construction as in claim 1 where the denier of all plies, both radial and bias, is between 840–1,680.

18. A tire construction as in claim 1 where the snaking is less than approximately 20° with respect to the axis of the radial ply.

19. A tire construction having a cured crown having a centerline and two opposite beads there being but a single bead on each side of the tire, said tire having at least one radial ply and at least two oppositely oriented bias plies, each ply having cords each of which extends from the single bead on one side to the single bead on the other side and around each such bead, half of the bias plies being oppositely oriented from the other half, the angle range of the cords of the bias plies in said cured crown being 10° – 70° with respect to the centerline, the angle of the cords of the radial ply in said cured crown being at least 78° with respect to the centerline; the cords of only said radial ply being snaked with the snaking being less than approximately 20° with respect to the axis of the radial ply; the twist range of all plies being 8 to 14 turns per inch "S" and "Z" construction for all deniers, and the thermal shrinkage range at 190° C. being 14 to 19 percent measured at 12 turns per inch.

* * * * *

UNITED STATES PATENT OFFICE
CERTIFICATE OF CORRECTION

Patent No. 3,672,423          Dated June 27th, 1972

Inventor(s) Alexander Duduk

It is certified that error appears in the above-identified patent and that said Letters Patent are hereby corrected as shown below:

Column 2, line 35, change "fort" to --forth--. Column 4, line 9, change "199" to --190--. Column 5, line 23, after "29" delete "°".

Signed and sealed this 24th day of October 1972.

(SEAL)
Attest:

EDWARD M. FLETCHER, JR.          ROBERT GOTTSCHALK
Attesting Officer                Commissioner of Patents